(12) United States Patent
St. Pierre

(10) Patent No.: US 11,444,973 B2
(45) Date of Patent: Sep. 13, 2022

(54) DETECTING OVER-MITIGATION OF NETWORK TRAFFIC BY A NETWORK SECURITY ELEMENT

(71) Applicant: Arbor Networks, Inc., Westford, MA (US)

(72) Inventor: Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 358 days.

(21) Appl. No.: 16/844,733

(22) Filed: Apr. 9, 2020

(65) Prior Publication Data
US 2021/0320943 A1    Oct. 14, 2021

(51) Int. Cl.
| | | |
|---|---|---|
| H04L 9/40 | (2022.01) | |
| H04L 49/00 | (2022.01) | |
| G06K 9/62 | (2022.01) | |
| H04L 43/18 | (2022.01) | |
| H04L 47/2441 | (2022.01) | |
| H04L 69/22 | (2022.01) | |

(Continued)

(52) U.S. Cl.
CPC ........ *H04L 63/1458* (2013.01); *G06K 9/6256* (2013.01); *H04L 43/028* (2013.01); *H04L 43/18* (2013.01); *H04L 47/2441* (2013.01); *H04L 49/70* (2013.01); *H04L 63/0263* (2013.01); *H04L 63/1433* (2013.01); *H04L 63/20* (2013.01); *H04L 69/22* (2013.01); *H04L 69/28* (2013.01)

(58) Field of Classification Search
None
See application file for complete search history.

(56) References Cited

U.S. PATENT DOCUMENTS 10,270,794 B1 *   4/2019  Mukerji .............. H04L 63/1425
11,075,886 B2 *   7/2021  Paul .................... H04L 63/0471
(Continued)

FOREIGN PATENT DOCUMENTS

WO    WO-2016035083 A2 *  3/2016  ............. G06F 21/55

*Primary Examiner* — Anh Vu H Ly
(74) *Attorney, Agent, or Firm* — Locke Lord LLP; Scott D. Wofsy; Christopher J. Capelli

(57) ABSTRACT

A computer method and system for detecting and preventing over-mitigation of network attacks (e.g., Denial of Service (DoS) attacks) upon a protected computer network by a network security element. A determination is made as to whether captured data packets transmitting to a protected network are associated with legitimate network traffic (e.g., non-attack traffic). A matching pattern of the captured data packets determined legitimate network traffic is generated and test traffic packets utilizing the matching pattern of the captured data packets are then generated. The generated test traffic packets are then injected into the network security element/filter. A determination is then made as to whether if the injected test traffic packets are treated as a malicious traffic (e.g., a DoS attack), or as legitimate traffic, by the network security filter. If treated as malicious traffic (e.g., the network security filter is treating legitimate traffic as malicious), indication is provided to cause changes to the network security filter to prevent legitimate traffic from being treated as malicious (e.g., attack/DoS traffic).

20 Claims, 2 Drawing Sheets

(51) Int. Cl.
*H04L 69/28* (2022.01)
*H04L 43/028* (2022.01)

(56) References Cited

U.S. PATENT DOCUMENTS

| | | | |
|---|---|---|---|
| 2006/0010389 A1* | 1/2006 | Rooney | H04L 63/1458 715/736 |
| 2020/0389431 A1* | 12/2020 | St. Pierre | H04L 69/22 |
| 2021/0120032 A1* | 4/2021 | St. Pierre | H04L 63/1458 |
| 2021/0126940 A1* | 4/2021 | O'Hara | H04L 63/126 |
| 2021/0160283 A1* | 5/2021 | St. Pierre | H04L 61/4511 |
| 2021/0266343 A1* | 8/2021 | St. Pierre | H04L 63/0227 |
| 2022/0078205 A1* | 3/2022 | Bjarnason | H04L 41/142 |

* cited by examiner

DETECTING OVER-MITIGATION OF NETWORK TRAFFIC BY A NETWORK SECURITY ELEMENT

FIELD OF THE INVENTION

The disclosed embodiments relate to communications systems and more particularly to methods and apparatus for detecting over-mitigation of network traffic data packets in a monitored network when preventing Denial of Service network attacks.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

It is to be appreciated that DoS attacks are often difficult to precisely prevent/block in monitored network traffic. That is, preventing/blocking only the attack traffic without blocking legitimate traffic (e.g., preventing over-mitigation of monitored network traffic). For instance, if a network operator configures a network security filter to be too restrictive in detecting DoS attacks in a monitored network (e.g., a typical technique for protecting against DoS attacks is to filter network traffic by blocking packets that match certain criteria), then legitimate traffic is blocked/dropped ("over-blocking" or "over-mitigation") in addition to the attack traffic, thus the attacker nevertheless achieves the goal of denying service to legitimate users. Thus, a need exists to determine when a particular DoS security technique (e.g., a filter configured to block attack traffic) is inadvertently blocking legitimate traffic.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with the illustrated embodiments, the methods and systems disclosed herein is a computer system and method operative to detect when a network security filter is configured to treat legitimate network traffic as malicious attack traffic thus preventing legitimate use of network services.

To achieve these and other advantages and in accordance with the purpose of the illustrated embodiments, in one aspect disclosed is a computer method and system for detecting and preventing over-mitigation of network attacks (e.g., Denial of Service (DoS) attacks) upon a protected computer network by a network security element (e.g., a filter). Preferably, first, a determination is made as to whether captured data packets transmitting to a protected network are associated with legitimate network traffic (e.g., non-attack traffic). A matching pattern of the captured data packets determined legitimate network traffic is then generated and test traffic packets (representative of legitimate non-attack network traffic) utilizing the matching pattern of the captured data packets are generated. The generated test traffic packets are then injected into the network security filter. A determination is then made as to whether if the injected test traffic packets are treated as a malicious traffic (e.g., a DoS attack) or as legitimate traffic by the network security filter. If treated as malicious traffic (e.g., the network security filter is treating legitimate traffic as malicious), indication (e.g., an alert message) is provided to cause changes to the network security filter to prevent legitimate traffic from being treated as malicious (e.g., attack/DoS traffic).

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

Figure 1:
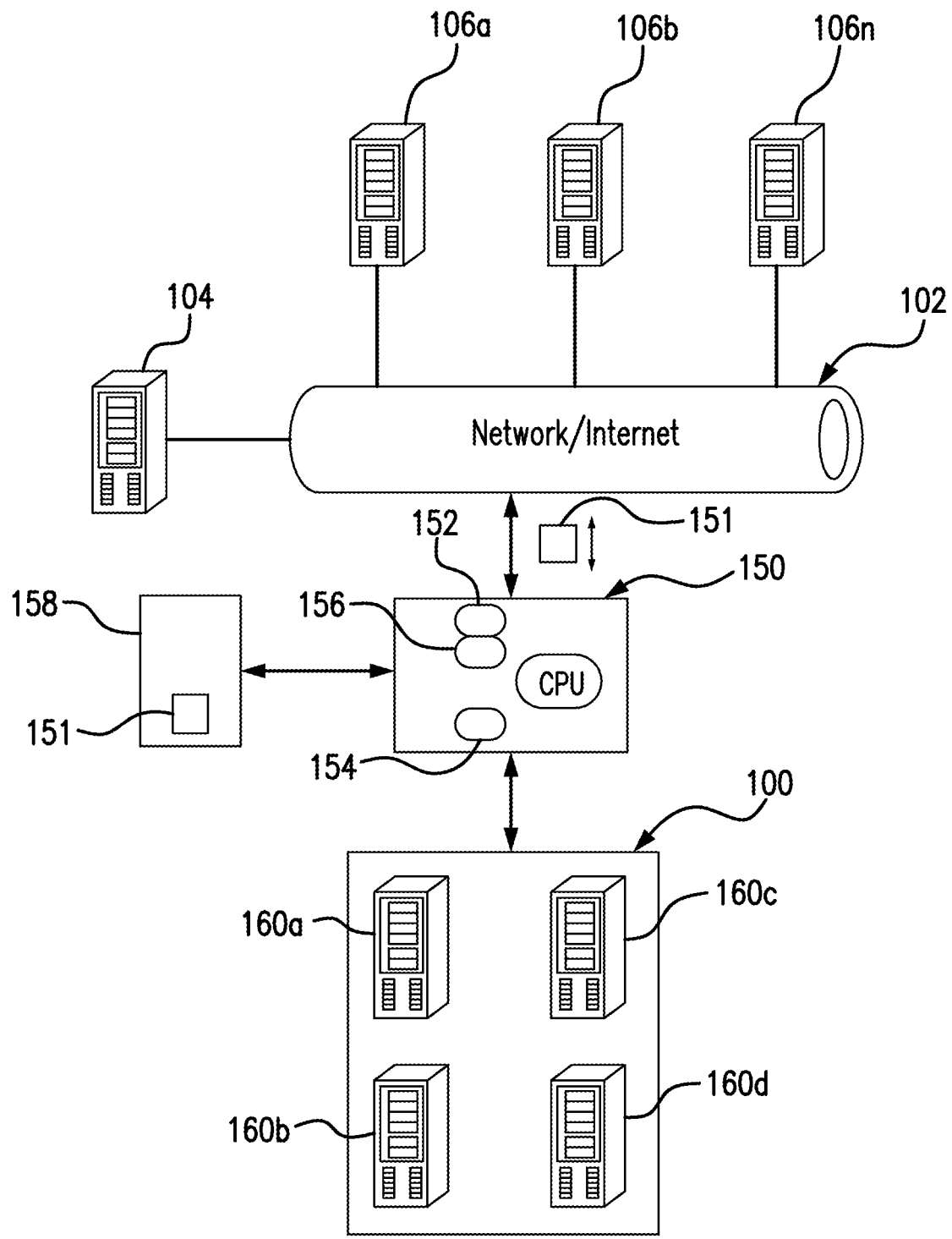
FIG. 1 illustrates an exemplary network communications system, in which an illustrative embodiment may be implemented.

Turning now descriptively to the drawings, in which similar reference characters denote similar elements throughout the several views, FIG. 1 illustrates a generalized system for determining when a network security filter is configured to treat legitimate network traffic as malicious attack traffic thus preventing legitimate use of network services. The exemplary embodiment of FIG. 1 depicts the relationship between a protected network 100, protection system 150, Network/Internet 102, and external host devices 106a-106n. It is to be appreciated that protected network 100 includes a plurality of servers 160a-160n preferably consisting of a plurality of server types, including, but not limited to: Generic; Web; DNS; Mail; VoIP; VPN; RLogin; and File Servers. It is to be appreciated that in accordance with an illustrated embodiment, the protection system 150 is configured and operable to enable a network user/administrator to determine, and prevent against, over-mitigation during an attack in the event legitimate traffic is being blocked in addition to attack traffic.

It is to be appreciated that the illustrated embodiment of FIG. 1 is merely provided for ease of discussions purposes for depicting a generalized exemplary environment of use for a security protection system. As such, it is to be understood the illustrated embodiment of FIG. 1 is not to be understood to be limiting, as other system configurations are capable of carrying out the process for enabling a network user/administrator to determine, and prevent against, over-mitigation during a DoS attack. In a typical implementation, the external host devices 106a-106n (also referred to as external devices or host devices) attempt to connect to protected network server devices 160a-160n within a protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 102 and the protected network 100. Usually, the protected network 100 is an enterprise network, such as a school network, business network, and government network, to list a few examples.

In other embodiments, the protection system 150 is located within the Internet, service provider network or enterprise network rather than as a network edge as illustrated. It is to be appreciated that when deployed within the protected network 100, traffic is diverted to the protection system 150.

The protection system 150 preferably includes a packet processing system preferably having an external high speed network interface 152 and a protected high-speed network interface 154. Typically, these interfaces are capable of handling 1-100 Gbps, for example. System 150 may further include processing modules, such as traffic analyzer 156 that preferably process the packets received at interfaces 152 and 154. Additionally, a central processing unit (CPU), random access memory (RAM), and one or more storage mediums/databases 158 are preferably connected through buses and are used to further support the threat detection processing of the received packets in accordance with the illustrated embodiments. Computer code is preferably stored in storage medium 158 and executed by the CPU of protection system 150. In one illustrated embodiment, the storage medium 158 may preferably include content-addressable memory (CAM), which is memory designed for use in very high speed searching applications. It is noted CAM memory operates different from the more commonly used random access memory (RAM). With RAM memory, a memory address is specified and the data stored at that address is returned. With CAM memory, the entire memory is searched to see if specified data are stored anywhere in the memory. The storage medium 158 may preferably store, capture, and collate sample network traffic data packets, as discussed further below.

In a typical implementation, and as described below, the protection system 150 is preferably configured and operable to perform first (e.g., process 200) and second (e.g., process 300) phases of operation, in either hardware, software modules, or a combination thereof. Briefly, with regards to the first phase (e.g., process 200), the protection system 150 captures and identifies a collection of known good traffic packets (e.g., not associated with DoS attack traffic) preferably in a "packet capture" (PCAP) file. Protection system then preferably uses a PCAP analyzer tool/module to generate a matching pattern of the captured data packets determined non-malicious network traffic. The generated matching pattern of the captured data packets is preferably a distillation of certain characteristics of the known-good traffic in the monitored network traffic 151, which for instance may consists of a list of protocol fields in the data packets; a corresponding list of values for fields having values appearing with high frequency amongst the data packets; and a regular expression (regex) that matches the data packets.

Briefly now with regards to the second phase (e.g., process 300), the protection system 150 provides the aforesaid matching pattern to a packet generator tool/module. The matching provides the packet generator with the essential characteristics of known-good traffic, and the packet generator is preferably configured and operable to provide random values for a remainder of a generated packet. The generated packet is then provided from the packet generator to a packet injector tool/module, which preferably injects the generated packet into a network security filter element configured for detecting DoS attacks. A determination is then made as to whether the network security filter element has passed or dropped the injected packet (which injected packet is representative of legitimate traffic). If passed, then this indicates the network security filter is configured and operable to permit passage of legitimate traffic 151 traversing towards the protected network 100. However, if the injected packet is blocked/dropped by the network security filter element, then this is indicative that the network security filter element is potentially dropping legitimate traffic, in which event an alert/message is preferably provided to the network user/administrator to make adjustments to the active network security filter. In accordance with the illustrated embodiments, adjustments may be to the network security filter element preferably by either the network user/administrator, or automatically when the network security filter element is configured for automated adjustments/re-configurations.

Figure 2:
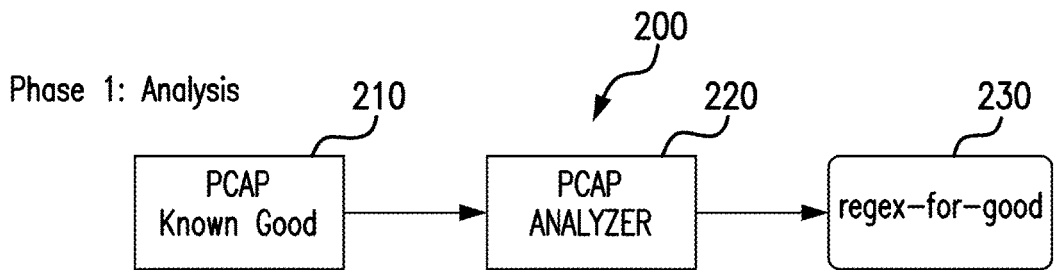
FIGS. 2 and 3 are flowcharts depicting certain operational steps performed in accordance with an illustrative embodiment.
Figure 3:
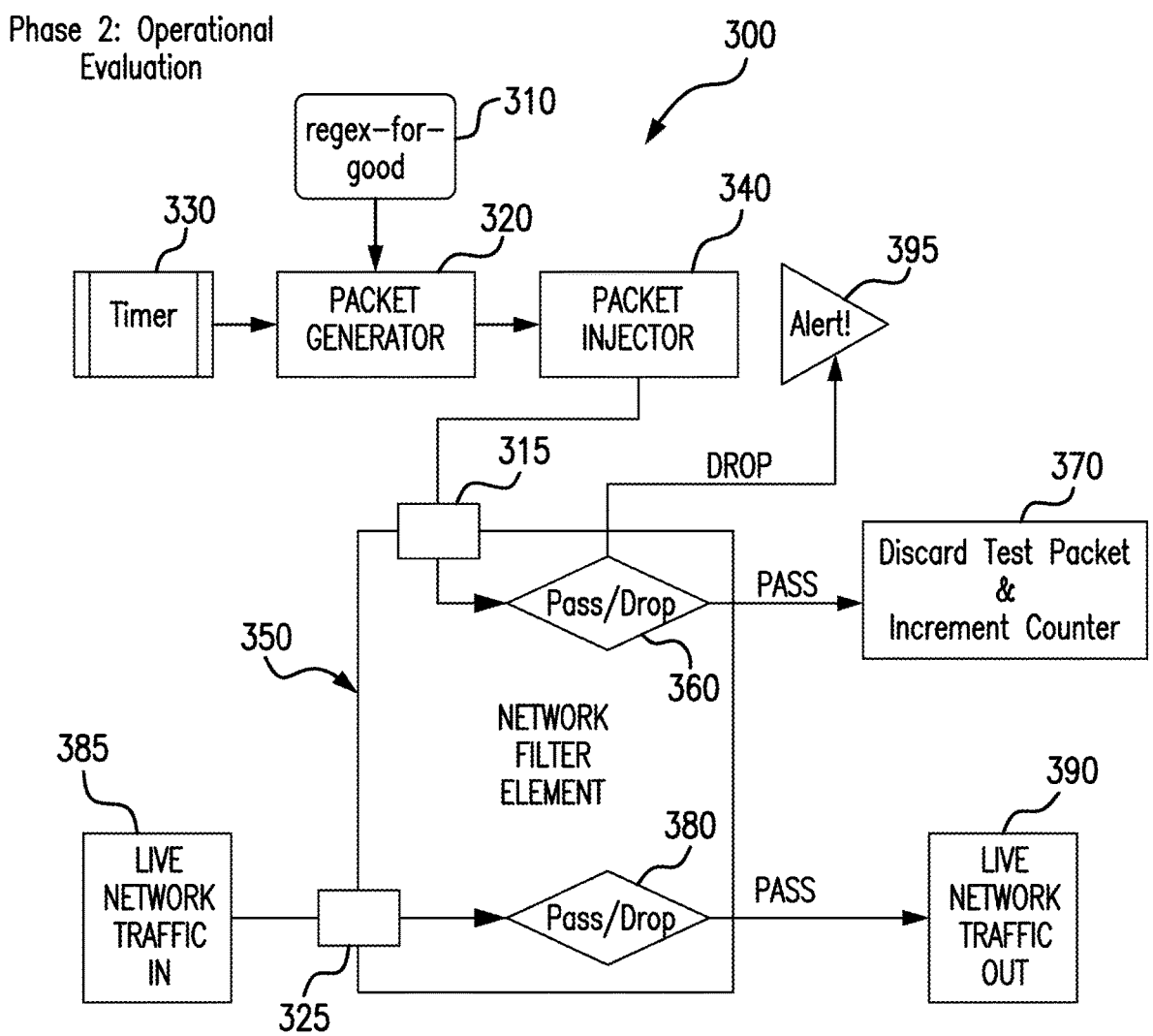

With reference now to FIG. 2 (and with continuing reference to FIG. 1) shown is flowchart depicting certain operational steps (process 200) performed by the protection device 150 in accordance with illustrative embodiments regarding analysis of captured data packets 151. It is to be appreciated the below described processes (200, 300) may be performed during an offline analysis (e.g., on a separate device such as a laptop) separate from the active mitigation performed by the network filter element 350. Before turning to the descriptions of FIG. 2, it is noted that the flow diagram shown therein is described, by way of example, with reference to components shown in FIG. 1, although these operational steps may be carried out in any system and are not limited to the scenario shown in the aforementioned figures. Additionally, the flow diagram in FIG. 2 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting at step 210, protection device 150 intercepts data communications (e.g., data intercept component 152, 154) occurring between one or more external computers 106a-106n, 104 in a monitored computer network 102 seeking connection with one or more host devices 160a-160d in the protected computer network 100. The intercepted data communications includes captured data packets 151. The captured packets 151 are then preferably sent to a Packet Capture (PCAP) capture device/module 210 configured and operative to determine whether the captured data packets 151 are associated with non-malicious network traffic (e.g., not associated with a network attack (e.g., DoS/DDos attack)). Next, a PCAP analyzer device/module 220 coupled to the PCAP capture device/module 210 is preferably configured and operative to generate a matching pattern of the captured data packets 151 determined non-malicious network traffic (step 230). For instance, the generated matching pattern of the captured data packets 151 may consists of: a list of protocol fields in the data packets; a corresponding list of values for fields having values appearing with high frequency amongst the data packets; and a regular expression (regex) that matches the data packets. It is noted that the packet generator 320 may be provided with multiple regexes generated from multiple known-good pcaps. Additionally, in accordance with the illustrated embodiments, it is to be appreciated that the generated matching patterns of the captured data 151 may include analyzing particular attributes of the captured data packets 151 (including certain protocol fields) and performing statistical analysis on the certain protocol fields to determined common protocol fields.

With continuing reference to FIG. 2 (and FIG. 1), the process 300 for conducting operational evaluation of the captured data packets 151 will now be discussed. The aforesaid matching pattern of the captured data packets determined to be non-malicious network traffic is provided (step 310) to a packet generator device/module 320 communicatively coupled to the PCAP analyzer device 220. In accordance with the illustrated embodiments, the packet generator device/module 320 is preferably configured and operative to generate test traffic packets utilizing the matching pattern of the captured data packets determined to be non-malicious network traffic (e.g., legitimate traffic). It is to be appreciated that the packet generator device/module 320 preferably has sufficient embedded knowledge regarding packet structure for various protocols, such that the remainder of the generated packet is not "truly" random (e.g., it has values for protocol fields that are random within the range of valid values for each field.). Additionally, the packet generator device/module 320 is preferably coupled to a timer element/module 330 enabling the packet generator element/module 330 to generate the test packets in accordance with prescribed time periods (e.g., 1 s, 5 s, 5 min, etc).

Next, these generated test packets are sent to a packet injector element/module 340 configured and operative to inject the generated test traffic packets into the network security filter 350 so as to determine if the injected test traffic packets are treated as a DoS attack by the network security filter (step 360). It is to be appreciated that the network security filter 350 is configured to inspect test packets for malicious traffic (step 380) which may be present in live network traffic 385 (preferably from one or more networks 100), which is then passed therethough for further network processing (if not dropped)(step 390). As is known, the network filter 350 is preferably configured and operative to detect if captured network packets 151 are associated with a network attack (e.g., a DoS attack) based upon prescribed filter settings. Typically mitigation actions include (but are not limited to): quarantining, rate limiting, blacklisting and dropping packets determined to be malicious traffic.

In the event the network filter element 350 determined the injected test packets that are indicative of legitimate traffic packets (e.g., not associated with a network attack) are determined to be malicious traffic (e.g., associated with a network attack) (step 360), then an alert message 395 is preferably provided to a network user/administrator indicating this occurrence, and the injected test packets are dropped/discarded. In the event the injected test packets are determined to the be legitimate network traffic by the network filter element 350, then these injected test packets are then preferably discarded and a counter may be incremented. This counter may be integrated in the network filter 350 to enable network engineers/users/administrators to view the counters for trouble shooting purposes. For instance, if a network user knows that 10 k test packets where injected into the network filter 350 of which five (5) packets were dropped and 9,995 were passed, then the network user knows all injected test packets are being properly accounted for by the network filter element 350.

Importantly, if it is determined the network filter element 350 treated the injected test packets as malicious attack traffic (steps 360, 395), then this facilitates adjustments being made to the network filter element 350 to prevent the occurrence of legitimate live traffic 385 (having same/similar characteristics to that of the injected test packets (as generated by packet generator 320)) from being treated as malicious attack traffic. In accordance with the illustrated embodiments, it is appreciated these adjustments may be made to the network filter element 350 either by a network user/administrator or automatically by the protection system 150.

In accordance with the illustrated embodiments, the generated test packets are preferably injected into a secondary port 315 associated with the network security filter 350, which secondary port 315 is separate from a primary port 325 receiving actual live traffic flow 385 for the network security filter 350 from the monitored computer network 100. For instance, the secondary port 315 may be a virtual port associated with the filter element 350. It is to be appreciated that the aforesaid injection of generated test packets is preferably performed on a virtual port 315 of the security filer 350 such that this injection does enter a real production network, which technique may not require the cooperation of the network filter element 350. It is to be additionally appreciated that the aforesaid process 300 for determining whether injected test packets are treated as legitimate traffic may be performed either while an actual network attack is occurring as detected by the security filter 350. Alternatively, the aforesaid process 300 for determining whether injected test packets are treated as legitimate traffic may be constantly performed upon the network security filter element 350 regardless of the occurrence of an actual network attack.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method performed by a computer system having one or more processors and memory storing one or more programs for execution by the one or more processors for preventing a network security filter from performing over-mitigation of Denial-of-Service (DoS) attacks upon a protected computer network, the method comprising steps of:
    intercepting data communications occurring between one or more external computers in a monitored computer network seeking connection with one or more host devices in the protected computer network, the intercepted data communications comprising captured data packets;
    determining whether the captured data packets are associated with non-malicious network traffic;
    generating a matching pattern of the captured data packets determined non-malicious network traffic;
    generating test traffic packets utilizing the matching pattern of the captured data packets determined to be non-malicious network traffic;
    injecting the generated test traffic packets into the network security filter; and
    determining if the injected test traffic packets are treated as a DoS attack by the network security filter.

2. The method performed by a computer system as recited in claim 1, wherein the one or more host devices in the computer network are computer server devices.

3. The method performed by a computer system as recited in claim 1, wherein determining whether the captured data packets are associated with non-malicious network traffic is only performed when protected computer network is not subject to a DoS network attack.

4. The method performed by a computer system as recited in claim 1, wherein the generated matching pattern of the captured data packets consists of: a list of protocol fields in the data packets; a corresponding list of values for fields having values appearing with high frequency amongst the data packets; and a regular expression (regex) that matches the data packets.

5. The method performed by a computer system as recited in claim 4, wherein generating the matching pattern of the captured data includes:
    analyzing particular attributes of the captured data packets, including certain protocol fields; and
    performing statistical analysis on the certain protocol fields to determined common protocol fields.

6. The method performed by a computer system as recited in claim 1, wherein the test traffic packets are generated in accordance with a timer.

7. The method performed by a computer system as recited in claim 1, wherein the generated test packets are injected into a secondary port associated with the network security filter, which secondary port is separate from a primary port receiving actual traffic flow for the network security filter from the monitored computer network.

8. The method performed by a computer system as recited in claim 7, wherein secondary port is a virtual port associated with the network security filter.

9. The method performed by a computer system as recited in claim 1, wherein the generated test packets are injected into the network security filter only when the protected computer network is subject to a DoS network attack.

10. The method as performed by a computer system as recited in claim 1, further including the step: providing indication when it is determined the injected test packets are determined to be a DoS attack by the network security filter.

11. The method as performed by a computer system as recited in claim 10, further including the step: adjusting one or more parameters of the network security filter to prevent the injected test packets from being treated as a DoS attack by the network security filter.

12. The method as performed by a computer system as recited in claim 1, further including the step: incrementing a counter when injected test traffic is determined not to be a DoS attack by the network security filter.

13. A computer system for monitoring network traffic associated with a plurality of protected network servers to configured to prevent a network security filter from performing over-mitigation of Denial-of-Service (DoS) attacks upon the plurality of protected network servers in a protected computer network, comprising:
    a network security filter configurable to detect presence of a Denial of Service (DoS) attack upon the protected network having the plurality of protected network servers;
    a data intercept device coupled to a computer network configured to intercept data communications occurring between one or more external computers seeking connection with one or more of the protected network servers in the protected computer network, the intercepted data communications comprising captured data packets;

a Packet Capture (PCAP) capture device coupled to the data intercept device configured and operative to determine whether the captured data packets are associated with non-malicious network traffic;

a PCAP analyzer device coupled to the PCAP capture device configured and operative to generate a matching pattern of the captured data packets determined non-malicious network traffic;

a packet generator device coupled to the PCAP analyzer device configured and operative to generate test traffic packets utilizing the matching pattern of the captured data packets determined to be non-malicious network traffic; and a packet injector device configured and operative to inject the generated test traffic packets into the network security filter to determine if the injected test traffic packets are treated as a DoS attack by the network security filter.

14. The computer system for monitoring network traffic as recited in claim 13, wherein PCAP capture device determines whether the captured data packets are associated with non-malicious network traffic only when protected computer network is not subject to a DoS network attack.

15. The computer system for monitoring network traffic as recited in claim 13, wherein the packet generator device includes a timer used to generate the test packets and wherein a counter is incremented when injected test traffic is determined not to be a DoS attack by the network security filter.

16. The computer system for monitoring network traffic as recited in claim 13, wherein the packet injector device injects the test packets into a secondary port associated with the network security filter, which secondary port is separate from a primary port receiving actual traffic flow for the network security filter from the monitored computer network.

17. The computer system for monitoring network traffic as recited in claim 13, wherein the packet injector device injects the test packets into the network security filter only when the protected computer network is subject to DoS attack.

18. The computer system for monitoring network traffic as recited in claim 13, wherein an indication is provided to a network user when it is determined the injected test packets are determined to be a DoS attack by the network security filter.

19. The computer system for monitoring network traffic as recited in claim 13, wherein one or more parameters of the network security filter are adjusted to prevent the injected test packets from being treated as a DoS attack when it is determined the network security filter determined the injected test packets to be a DoS attack.

20. A method performed by a computer system having one or more processors and memory storing one or more programs for execution by the one or more processors for preventing a network security filter from performing over-mitigation of Denial-of-Service (DoS) attacks upon a protected computer network, the method comprising steps of:

intercepting data communications occurring between one or more external computers in a monitored computer network seeking connection with one or more host devices in the protected computer network, the intercepted data communications comprising captured data packets;

determining whether the captured data packets are associated with non-malicious network traffic when the protected computer network is not subject to a DoS attack;

generating a matching pattern of the captured data packets determined non-malicious network traffic;

generating test traffic packets utilizing the matching pattern of the captured data packets determined to be non-malicious network traffic in accordance with certain time intervals as prescribed by a timer;

injecting the generated test traffic packets into the network security filter wherein the generated test packets are injected into a secondary port associated with the network security filter, which secondary port is separate from a primary port receiving actual traffic flow for the network security filter from the monitored computer network;

determining if the injected test traffic packets are treated as a DoS attack by the network security filter; and providing indication when it is determined the injected test packets are determined to be a DoS attack by the network security filter.

* * * * *